United States Patent

[11] 3,610,205

[72] Inventors Kenneth W. Rarey
South Holland;
John B. Kennedy, Jr., Oak Forest, both of Ill.
[21] Appl. No. 768,377
[22] Filed Oct. 17, 1968
[45] Patented Oct. 5, 1971
[73] Assignee Continental Can Company, Inc.
New York, N.Y.

[54] APPARATUS FOR MEASURING AND CONTROLLING MIXTURE CONTENT
14 Claims, 6 Drawing Figs.

[52] U.S. Cl. .................................... 118/637,
101/114, 117/17.5, 118/9, 118/603, 222/57, 356/201
[51] Int. Cl. .................................... B05b11/00,
B05c 5/02
[50] Field of Search .......................... 118/637.7,
603; 117/17.8, 37; 101/114; 222/57; 356/201

[56] References Cited
UNITED STATES PATENTS

| | | | |
|---|---|---|---|
| 2,956,487 | 10/1960 | Giaimo, Jr. .................. | 117/17.5 X |
| 3,094,049 | 6/1963 | Snelling ...................... | 118/637 X |
| 3,233,781 | 2/1966 | Grubbs ........................ | 118/637 UX |
| 3,306,193 | 2/1967 | Rarey et al. .................. | 118/637 X |
| 3,336,905 | 8/1967 | Lehmann ..................... | 188/637 |
| 3,376,853 | 4/1968 | Weiler et al. ................. | 117/17.5 X |
| 3,399,652 | 9/1968 | Gawron ........................ | 117/17.5 X |
| 3,430,606 | 3/1969 | Pease et al. .................. | 117/17.5 X |

*Primary Examiner*—Peter Feldman
*Attorney*—Diller, Brown, Ramik & Holt

ABSTRACT: Apparatus for detecting the ratio of component particles in a mixture wherein the quantity of one of the component particles is continually decreased, as in an electrostatic printing operation, includes the provision of a window adjacent the path of movement of the mix of component particles and contacting particles in transit therepast, illumination of the mix through the window and detection of light reflected from the mix through the window. Replenishment of the depleted component may be electrically controlled in accordance with the light reflected and optical filter provisions may be employed to limit the spectrum of the light with which the mix is illuminated where the components of the mix differ in color. Diversion of a quantity of mix to bypass an area wherein depletion of one component occurs effects mixing in the direction of flow and crossflow mixing effects greater consistency in the mix transverse to the direction of flow.

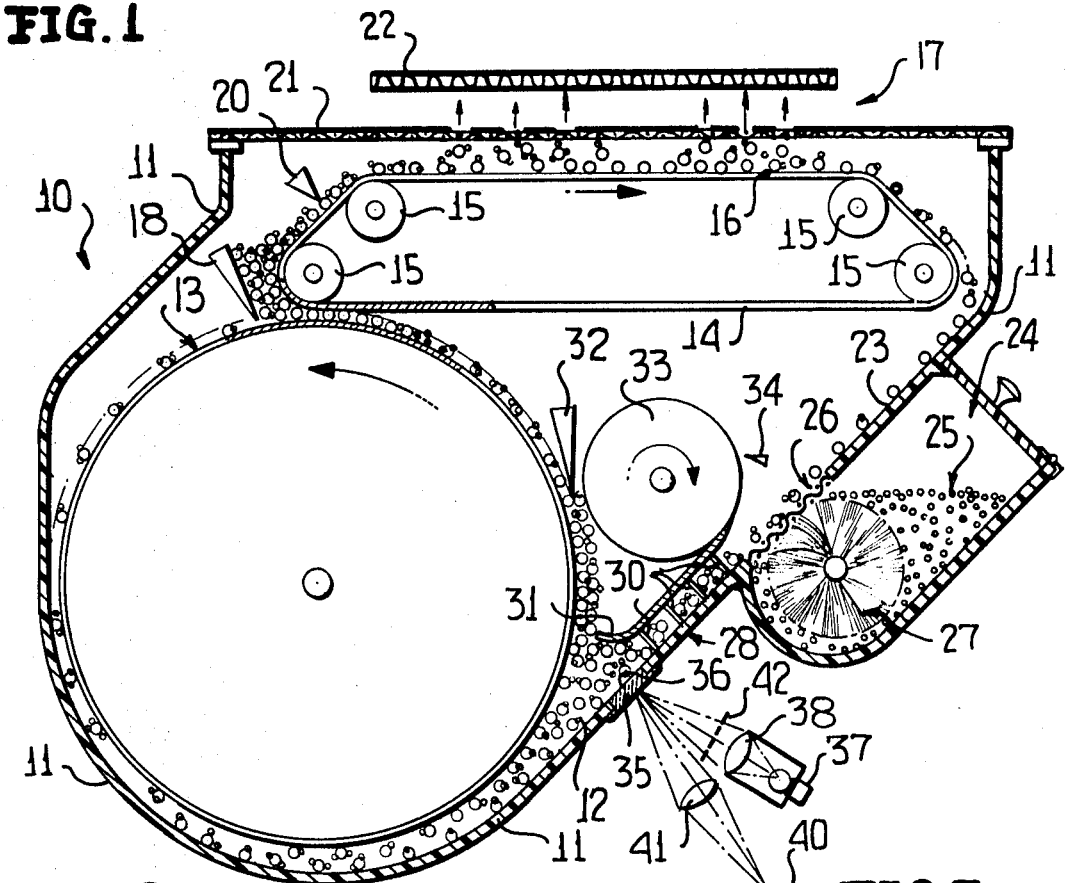

INVENTORS
KENNETH W. RAREY &
JOHN B. KENNEDY, Jr.

BY
Mason, Porter, Diller & Brown
ATTORNEYS

APPARATUS FOR MEASURING AND CONTROLLING MIXTURE CONTENT

This invention relates generally to apparatus for measuring and controlling the ratio of components in a mixture of two or more components and more particularly to apparatus for optically detecting and electrically controlling the ratio of toner to carrier particles in an electrostatic printing operation.

Previously optical-monitoring of mixtures to indicate the ratio of component particles therein has been employed. However, previously known methods and apparatus have been marked by several disadvantages including the tendency of the employed optical-monitoring system to exhibit a reduction in sensitivity on prolonged use resultant from the dusting or collection of particles on surfaces of the optical system. Similarly, previously known optical-monitoring system have failed to provide for differences in color between the component particles of a mixture to provide an indication of the ratio of those component particles based upon such differences in color. Further, previously known optical-mixture monitoring systems and control provisions have failed to provide either methods or apparatus for correcting the ratio of component particles in a moving mix while providing a complete mixing of those particles both in the direction of flow and transverse thereto.

In view of the foregoing, it is an object of this invention to provide apparatus for optically monitoring the ration of component particles in a mixture of such particles without a reduction in sensitivity through the build up of particles upon portions of the optical system.

In accordance with the immediately foregoing object, it is a further object of this invention to provide an optical-monitoring system including a window adjacent the path of movement of the mix and having a surface over which particles of the mix slide in automatic cleaning action, and light source and photosensitive provisions for illuminating the mix in transit past the window and for detecting light reflected from the mix.

A further object of this invention is to provide apparatus for indicating the ration of component particles in a mix through the employment of optical-monitoring provisions including a light source for illuminating a portion of the mix, photosensitive means for receiving the light reflected from the mix and an optical filter for limiting the spectrum of light projected against the mix, causing the degree of reflected light to depend largely upon the ration of component particles of differing color.

Still another object of this invention is to provide apparatus for increasing the consistence of a mixture of two or more component particles which are moved to and away from an area wherein the quantity of one of the component particles is decreased and including the diversion of a quantity of the particles to bypass the aforesaid area, providing mixing of the component particles in the direction of flow of the mix and providing mixing of the component particles transverse to the direction of flow of such particles to provide a consistency of mix across the flow thereof.

Still another object of this invention is to provide in an electrostatic printing or coating apparatus provisions for optically monitoring a carrier mix of carrier and toner particles, means responsive to the optical-monitoring of the mix for providing an electrical signal indicative of the ratio of component particles in the mix and means for replenishing toner in the developer mix upon occurrence of an electrical signal of a predetermined magnitude.

With these and the further objects in view that will hereinafter appear, the nature of the invention will be more clearly understood with reference to the several figures of the accompanying drawings, the following description and the appended claims.

IN THE DRAWINGS

FIG. 1 is a diagrammatic view of electrostatic printing apparatus, and shows the optical provisions for monitoring the employed developer mix, a first mix-transporting drum, a second mix-diverting drum and crossflow-mixing provisions.

FIG. 2 is a graphical illustration potting the variation in optical density of a quantity of developer mix against variations in the percentage toner particles in the mix.

FIG. 3 is a graphical illustration plotting variation in the optical density of a quantity of developer mix employing red toner particles against variations in the percentage toner particles in the mix and illustrates the variations in optical density resultant from the alternate employment of a blue and a red filter illuminating the developer mix.

Figure 4:
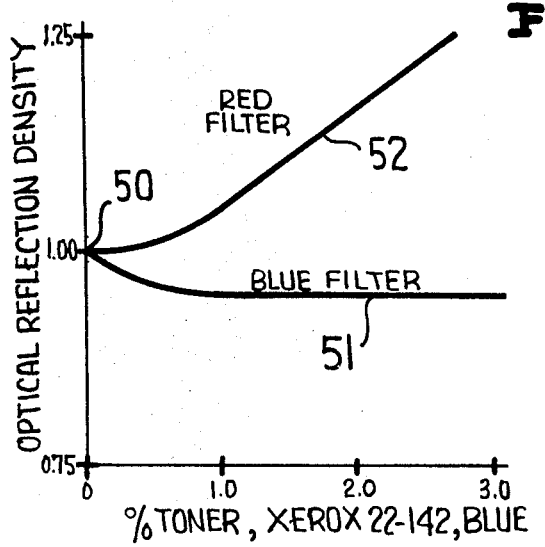
FIG. 4 is a graphical representation plotting optical density of a portion of developer mix including blue toner particles against variations in the percentage toner particles in the developer mix and shows the variations in optical density resultant from the alternate employment of a red filter and a blue filter in the illumination of the developer mix.

Referring to the drawings in detail, FIG. 1 illustrates an electrostatic printing device, generally referred to by the numeral 10, of a type suitable for use in the practice of this invention and similar to the electrostatic printing device shown and described in the U.S. Pat. to K. W. Rarey and J. B. Kennedy, Jr., No. 3,306,193. The electrostatic printing device or printing machine 10 includes a suitable housing 11, shaped to define a developer mix depository 12. The mix depository 12 is positioned to receive a quantity of developer particles and toner particles which may be commercially available or of a type suitably selected for employment in the electrostatic printing or coating process.

Disposed adjacent the depository 12 of the printing machine 10 is a rotatable magnetic feeding drum 13 which, upon rotation, transports a quantity of the developer mix upwardly into adhering relation with an elongate conductive belt electrode 14. The conductive belt 14 is entrained for movement about a plurality of belt support pulleys 15 and an upper run 16 of the endless conductive belt 14 conveys a predetermined quantity of mix into the printing zone, generally referred to by the numeral 17, of the overall printing apparatus 10. A first doctor blade 18 is arranged adjacent the exterior of the cylinder 13, providing a backup of developer mix adjacent the belt electrode 14 and a second doctor blade 20 is arranged in proximity to the belt electrode 14, providing an even distribution of developer mix upon the upper run 16 of the belt electrode 14 within the printing zone 17. The establishment of an appropriate field or fields in the printing zone 17 draws the particles of developer upwardly into contact with a screen stencil 21 and a portion of the toner particles of the developer mix are removed from the carrier particles for the production of an image or coating upon a substrate 22, as determined by the configuration of the masking of the screen stencil 21. It will, of course, be evident that the ratio of carrier particles to toner particles is altered within the printing zone 17 and the developer mix is conveyed via the conductive belt electrode 14 away from the printing zone 17 for return to the depository 12.

The quantity of toner particles in the developer mix is replenished during movement of the developer mix from the printing zone 17 to the depository 12 via a surface 23 provided upon an interior portion of the housing 11. A toner reservoir 24 provides a source for replenishing of toner in the developer mix from a supply 25 of toner housed therein. A screened window 26 communicates through the surface 23 between the interior of the housing 11 and the reservoir 24 and a rotatable brush 27 effects passage of toner particles through the screened window 26 and developer particles en route from the printing zone 17 to the depository 12 pass across the screened window 26. The screen mesh of the window 26 is sufficiently fine to prevent passage of carrier particles therethrough while permitting rotation of the brush 27 to effect replenishment of the toner in the developer mix recently employed in the printing operation.

The replenished developer mix continues past the screened window 26, along the interior surface 23 of the housing 11 and into the depository 12. Crossflow-mixing provisions generally indicated by the numeral 28 are provided immediately following the screened window 26 along the path of movement of the developer mix and include a plurality of pins 30 mounted between the surface 23 and a guide plate 31 lying parallel to and above the surface 23. The pins 30 intersect the path of flow of the developer, providing obstacles with which the developer particles collide to cause those particles to move at least partially transverse to the general direction of flow of the developer during its passage through the crossflow-mixing provisions 28. Accordingly, mixing of the developer in the direction transverse to the flow of the developer mix is effected, providing greater homogeneity of the mix in the direction transverse to the general flow thereof.

A blade 32 mounted adjacent the outer periphery of the magnetic drum 13 intersects movement of a portion of the developer particles carried upon the periphery of the drum 13 and a further magnetic drum 33 having its periphery adjacent the blade 32 and on the opposite side thereof from the first-mentioned magnetic drum 13 carries the portion of developer mix intersected by the blade 32 away from the main magnetic drum 13 and an additional doctor blade 34 removes the diverted developer mix from the surface of the drum 33, returning that portion of the mix into the general flow of developer from the printing zone 17. The blade 32 and magnetic drum 33 effect mixing of the developer in the direction of flow of the developer by diversion of a quantity of the mix and reapplication of that quantity into the mix flowing along the surface 23 of the housing 11.

A window 35 communicates between the interior and exterior of the housing 11 adjacent the flow path of developer within the overall printing apparatus 10 and is placed along that path of flow immediately following the cross-mixing provisions 28. The window 35 defines an interior surface 36, coplanar with the interior surface 23 of the housing 11 and providing a surface over which developer mix flows during its passage past the window 35. Attention may be given to the location of the window 35 to assure that the developer contacting the interior surface 36 is in motion and in sliding contact with the surface 36 to provide automatic cleansing of the interior surface, substantially reducing the "dusting" effect resultant from a build up of toner deposit upon the interior surface such as reduces the transparency provided by the window 35 during operation of the printing apparatus 10.

A light source 37 which may include an associated lens or lens system 38 is positioned to project a light beam through the window 35 and against the developer mix in transit therepast. A photosensitive detector or sensor 40 is positioned to receive light reflected through the window 35 from the mix in transit therepast and a further lens or lens system 41 may be provided for focusing the reflected light upon the photosensitive detector 40. A colored optical filter 42 is shown intersecting the light with which the developer mix is illuminated to limit the spectrum thereof and to provide greater sensitivity of the photosensitive detector 40 to variations in the ratio of toner to carrier, as will be discussed more fully hereinafter.

In an electrostatic printing operation such as that provided by the overall printing apparatus generally referred to by the numeral 10, it is common to employ toner particles of finely divided, pigmented or dyed resin, these particles having an average "diameter" in the range 10 to 15 microns. The carrier particles employed in the developer mix commonly are from 6 to 8 times larger in diameter than the aforementioned toner particles. It has been found that best printing results when the percentage by weight of toner particles in the overall developer mix is in the range from about 2 percent through 4 percent. Within this range, variations in the percentage of toner have relatively little effect on the quality of the produced image or coating.

Where production rate printing or coating is to be effected, as for example, in the case where a large number of serially conveyed articles are to have toner applied thereto, a number of printing operations may be effected without the addition of toner, provided the percentage of toner in the developer mix remains within the range indicated hereinabove. Thorough mixing of the carrier and toner, as by the crossflow-mixing arrangement 28 discussed hereinabove and by the diversion and reapplication of developer mix discussed hereinabove with respect to the magnetic drum 33, allows a fuller employment of the developer mix within a printing apparatus prior to the addition of toner. However, where printing or coating is to be effected at production rates, it is desirable to automatically supply additional toner, maintaining the percentage toner within the preferred 2 percent through 4 percent range, without attention to the number of printing operations effected by the printing apparatus. Further, it should be noted that where a solid coating is to be applied to a substrate, the number of successful printing operations possible between additions of toner is substantially reduced.

Where the toner and carrier particles constituting the developer mix are of differing optical qualities, that is, differing in reflective qualities or color, the optical density of the developer will be dependent upon the percentage toner or ratio of toner particles to carrier particles within the developer mix. Reflection of light from a portion of the developer mix is dependent upon the optical density of the mix and as the optical density increases through the increase of particles of greater light-absorbent characteristic, the reflection of light from the portion of developer decreases.

FIG. 2 represents the variation of optical density with variation of percentage of toner in a developer mix employing nickel carrier particles, medium grey in appearance, and "Xerox 914" black toner. Employing a Macbeth RD–100 Densitometer, the optical density indicated for the carrier particles alone was slightly less than 1.00 as indicated at point 45 in FIG. 2. As the percentage toner within the carrier mix was increased, a substantially linear increase in optical density was indicated as illustrated by the line 46 in FIG. 2. The relatively substantial change in optical density indicated by FIG. 2 where black toner particles are employed provides sufficient alteration in the light reflected from a portion of the mix to allow monitoring of the ratio of constituent mix components.

It will be apparent that where the constituent mix component exhibit one or more colors other than white, black and intermediate grey shades, variations in the reflection of "white" light from the developer mix will be substantially reduced for variations in percentage toner. Optical filtration of the light applied to the mix, however, may be employed to limit the spectrum of the light from the illuminating light source to cause reflection from the developer mix to again vary substantially with variations in the ratio of constituent mix components. Illumination of the mix with a colored light beam of a color which is either substantially reflected or substantially absorbed by one of the colored mix components causes the reflective characteristic of the mix to approximate the reflective characteristics of a system wherein the mix varies in shades between black and white.

Illustrated in FIG. 3 is the optical density of developer mix employing "Xerox 22–146" red toner particles and the aforementioned medium grey nickel carrier particles, plotted against variations in the percentage of toner particles within the mix. The illustrated measurements where again made with a "Macbeth RD–100 Densitometer" and illumination of the mix via a red filter indicated an optical density of approximately 1.00 in the absence of toner as indicated at point 47 in FIG. 3. An increase in the percentage of red toner particles within the mix resulted in a greater reflection of light therefrom and a resultant decrease in the indicated optical density as illustrated by the line 48 of FIG. 3. Similarly, the employment of a blue filter resulted in a greater absorbing of the light as the percentage of red toner was increased as indicated by the line 50 in FIG. 3.

In FIG. 4 there is illustrated variations in optical density with variations in the percentage of blue toner of the type designated "Xerox 22-142" in a mix employing the aforementioned medium grey nickel carrier particles. The aforementioned densitometer was employed to indicate the optical densities illustrated in FIG. 4 and a blue filter, limiting the spectrum of the light illuminating the mix to a portion of the blue range, resulted in a slight decrease in the indicated optical density with increases in the percentage of blue toner, as illustrated by the line 51 of FIG. 4, and resultant from a greater reflection of the blue light with increases in the "blueness" of the developer mix. However, the blue filter employed did not provide truly significant variations in the indicated optical density, thus illustrating that a blue filter of slightly differing color characteristic would be preferable if the reflected light was to be employed to indicate the ratio component particles in the mix. However, the employment of a red filter provided a substantial variation in indicated optical density from 1.00, representing a complete deficiency of blue toner as indicated at point 50 in FIG. 4 and a substantial increase in optical density with increases in the percentage of employed blue toner as indicated by the line 52 in FIG. 4.

Figure 6:
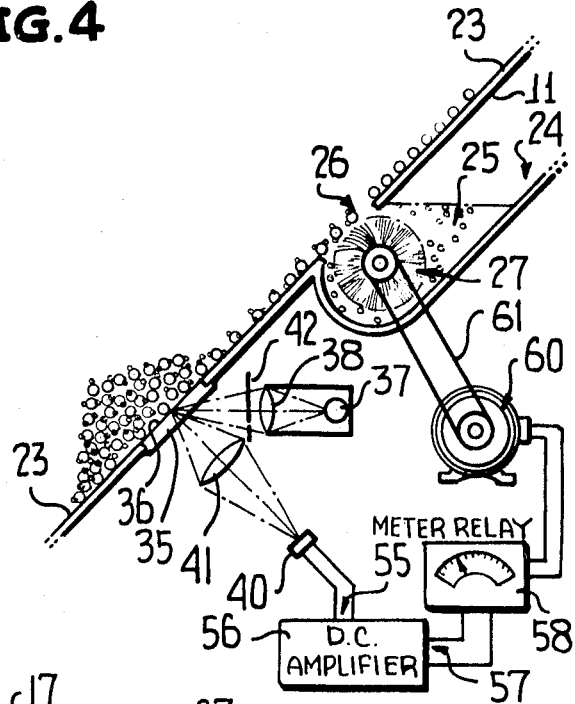
FIG. 6 is an enlarged diagrammatic view of the optical system of FIG. 1 and illustrates the employment of a photosensitive sensor and meter relay combination for indicating the ration of component portions of the mix and for controlling toner addition.

FIG. 6 illustrates the employment of an optical-monitoring system as illustrated in FIG. 1 with suitably selected control provisions for controlling the addition of toner to maintain the toner within the predetermined optimum percentage range. Again, the window 35 is provided having a surface 36 coplanar with the interior surface 23 of the housing 11. In view of the fact that the developer mix moves directly across the surface 36 of the window 35 in contact therewith, fabrication of the window 35 from sapphire or other abrasion resistant material is preferable. The light source 37, illuminating the mix through the window 35 may be chosen from suitable or commercially available illuminators such as the "1087 Microscope Illuminator" available from the American Optical Company. Preferably the photosensitive detector or sensor 40 constitutes a photovoltaic cell, again suitably selected or commercially available, such as the "82M Selenium Photovoltaic Cell" available from the International Rectifier Corp. The cell 40 provides a small DC output signal representative of the light reflected thereto from the mix adjacent the window 35 and the output signal from the cell 40 is applied to the input 55 of a suitably selected or commercially available DC amplifier 56. The amplified DC signal is taken from an output 57 of the amplifier 56 and applied to a meter relay 58. The meter relay 58 may be of a known or commercially available type such as the "503L" 0-1 ma. meter and "MOdel 901A" relay control module combination available from Assembly Products, Incorporated and includes meter provisions for indicating the magnitude of the DC current applied thereto. The meter relay 58 provides and output signal therefrom as by the closure of relay contacts included therein upon the occurrence of an input of predetermined magnitude, thus controlling operation of a suitably selected motor 60 connected in driving relation, as at 61, with the brush 27 of the toner-replenishing provisions of the overall printing apparatus 10. As the percentage of the toner within the developer mix drops to a predetermined percentage within the optimum percentage range, the motor 60 is energized effecting replenishment of toner into the developer mix via the screened window 26.

Figure 5:
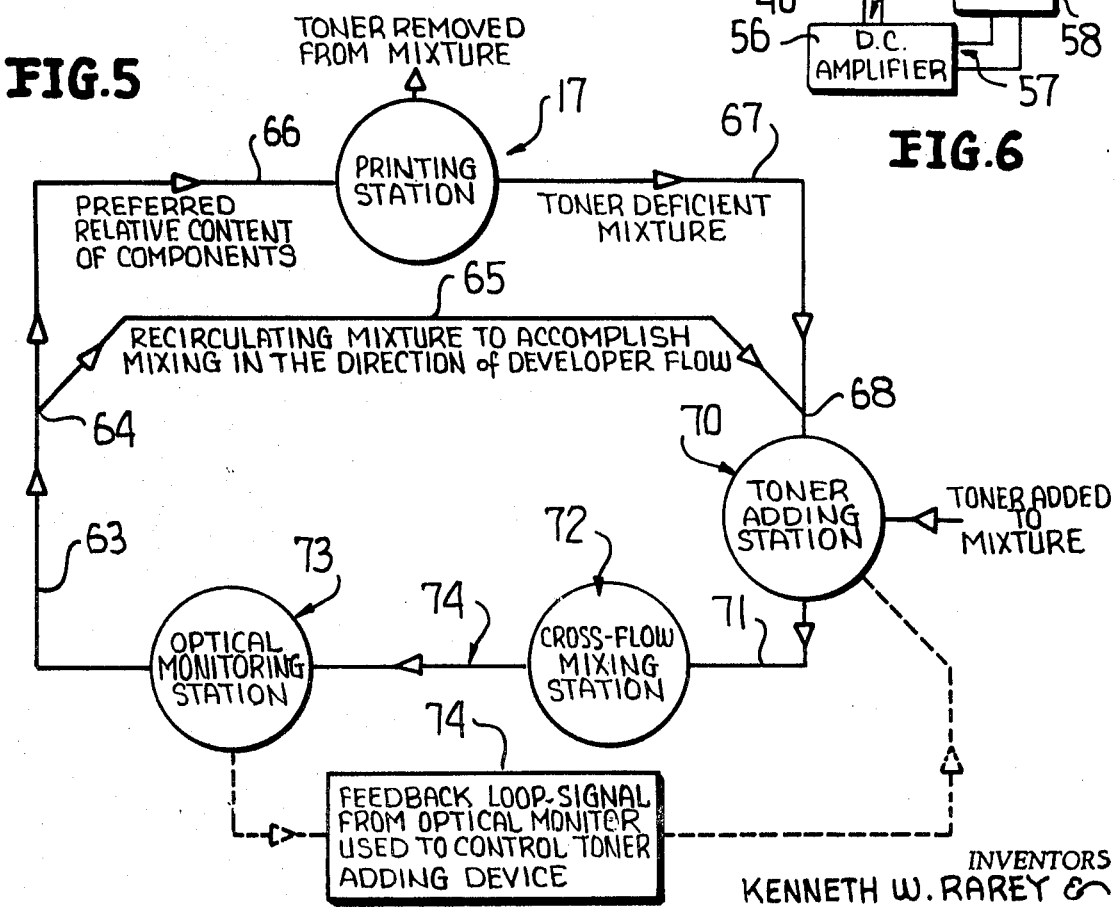
FIG. 5 is a diagrammatic illustration of the operation of the electrostatic printing apparatus according to FIG. 1 and illustrates the movement of developer mix in such apparatus, including the diversion of recirculation of a portion of the mix and the crossflow-mixing following toner addition.

FIG. 5 diagrammatically illustrates the overall operation of the printing apparatus of FIG. 1, employing the mix monitoring and control provisions of FIG. 6. Developer mix is moved along a predetermined path 63 and at point 64 a portion of the mix moving along the path 63 is diverted along a recirculation path 65, while a remaining portion of the mix is directed, via a path 66 to the printing station or zone 17 for application in a printing or coating process. Toner-deficient mix is taken from the printing zone 17 along a path 67 and rejoined with the diverted or recirculated portion of mix at the point 68. The diverted or recirculated portion of mix, then, has bypassed the printing zone 17 via the path 65 and the percentage toner so diverted has not been altered. The combined toner-deficient mix quantity and diverted quantity passes a toner adding station 70 which may include the reservoir, brush and screened window combination illustrated in FIG. 1. Replenishment of toner occurs at the toner-adding station 70 and the replenished developer mix is passed along a path 71 to a crossflow-mixing station 72 such as the crossflow-mixing provisions 28 illustrated in FIG. 1. The now-substantially homogeneous mix is passed to an optical-monitoring station 73 via a path 74 and at the station 73 which may include the monitoring provisions discussed hereinabove, the mix is optically monitored and control provisions 74, connected in feedback relation to the toner adding provisions 70 control the addition of toner when the necessity of such an addition is detected at the monitoring station 73. It will be noted from FIG. 5 that the homogeneity of the employed developer mix is greatly increased by the provision of crossflow-mixing intermediate the toner-adding station 70 and the optical-monitoring station 73 and by the recirculation of a diverted portion of the mix of preferred toner/carrier proportions. This provides consistency in the printing operation occurring at the printing zone 17 and assures correct operation of the optical-monitoring provisions by assuring monitoring of a substantially homogeneous portion of developer at the station 73.

While preferred methods and apparatus have been indicated herein, variations from the described preferred embodiments within the spirit and scope of this invention will be apparent to those skilled in the art.

We claim:

1. An electrostatic printing or coating device comprising a depository for a developer mix of carrier particles and toner particles of differing optical qualities, means for transporting a toner-sufficient portion of said developer mix from said depository into an application area, means for applying toner particles from said toner-sufficient portion of said mix in said application area to a substrate causing that portion of the mix to become a toner-deficient portion, means for moving said toner-deficient portion of said mix from said application area to a toner-replenishing station, toner-replenishing means for adding toner particles directly to said toner-deficient portion of said mix to compensate for the toner particles applied to said substrate, viewing window means adjacent said toner-replenishing means along the path of movement of said toner-deficient portion of said mix, optical-sensing means adjacent said window means on the opposite side thereof from the path of movement of said mix, said optical-sensing means including a light source for projecting light through said window against said mix, and a photoelectric sensor for receiving light reflected from said mix through said window and for indicating the ratio of component particles in said mix, and means electrically connected with said photoelectric sensor for controlling said toner-replenishing means.

2. A device according to claim 1 wherein said optical-sensing means further comprises colored optical filter means, limiting the spectrum of light projected against said mix by said light source for increasing variations in light reflected from said mix resultant from variations in the ratio of component particles in said mix.

3. A device according to claim 1 wherein said printing or coating device includes an inclined surface lying along the path of movement of said mix within said device and along which a portion of said mix slides in transit therepast, said window means comprising a transparent pane mounted in said inclined surface for sliding and supporting engagement with said mix to provide self-cleansing of said window.

4. A device according to claim 1 wherein said means electrically connected with said photoelectric sensor for controlling said toner-replenishing means includes meter-relay means and means connecting said photoelectric sensor and said meter-relay means for applying an electrical signal to said meter-relay means, said meter-relay means having a meter responsive to signals applied thereto for indicating the ratio of component particles in said mix and means responsive to a predetermined signal strength for providing an output from said meter-relay means.

5. A device according to claim 4 wherein said toner-replenishing means includes a toner reservoir, a screened aperture communicating between said reservoir and the interior of said printing or coating device, rotatably mounted brush means for transporting toner particles to said screened aperture through said screened aperture and motor means electrically connected with said meter-relay means for actuation by the output therefrom.

6. A device according to claim 3 wherein said pane is of sapphire, thereby resisting abrasion of said pane by sliding movement of said mix thereon.

7. A device according to claim 1 wherein said toner-replenishing means is located upstream with respect to said window means and along said path of movement of said mix, means for mixing the replenished developer mix comprising crossflow-mixing means intermediate said toner-replenishing means and said window means, said crossflow-mixing means including a plurality of mix-contacting obstacles extending into the path of mix movement.

8. A device according to claim 3 wherein said toner-replenishing means is located upstream with respect to said window means along said path of movement of said mix, said toner-replenishing means including an aperture opening through said inclined surface for passage of toner therethrough, means for mixing the replenished developer mix comprising crossflow-mixing means intermediate said toner-replenishing means and said window means, said crossflow-mixing means including a plurality of obstacles extending outwardly from said inclined surface for contacting mix in transit on said inclined surface.

9. An electrostatic printing or coating device employing a developer mix of carrier and toner particles comprising means for transporting a toner-sufficient portion of said developer mix into an application area, means for applying toner particles from a portion of said mix in said application area to a substrate causing that portion of the mix to become a toner-deficient portion, means for moving said toner-deficient portion from said application area to a replenishing station, toner-replenishing means for adding toner directly to said toner-deficient portion to compensate for the toner particles applied to said substrate, said toner-replenishing means including means for diverting a portion of the mix in transit to said application area and for adding said diverted mix portion to said toner-deficient portion in transit from said application area to provide mixing in the direction of developer flow.

10. A device according to claim 9 further comprising crossflow-mixing means located in the path of movement of said mix for providing movement of the component particles of the mix at least partially transverse to the path of movement of the mix.

11. A device according to claim 9 wherein said means for transporting a portion of said mix into an application area comprises a first rotatable drum for carrying developer mix on the surface thereof, said means diverting a portion of the mix comprising a second rotatable drum adjacent said first drum for receiving the diverted portion of mix from the surface of said first drum onto the surface of said second drum to bypass said application area.

12. An electrostatic printing or coating device employing a developer mix of carrier and toner particles comprising means for transporting a portion of said developer mix along a first path into an application area, means for applying toner particles from said mix to a substrate, means for returning mix along a second path from said application area, toner-replenishing means located along said second path for replenishing toner in said mix to compensate for the toner particles applied to said substrate, said toner-replenishing means including means for diverting a portion of said mix in transit on said first path to a point in said second path to provide developer mixing transverse to the direction of movement crossflow-mixing means located along said second path following said means for replenishing for providing developer mixing transverse to the direction of movement of mix, and mix-monitoring means located along said second path following said crossflow-mixing means for detecting the ratio of component particles in said developer mix.

13. A device according to claim 12 wherein said means for transporting a portion of said developer mix along a first path includes a first rotatable drum for carrying developer mix thereon, said means for diverting a portion of the mix comprising a second rotatably drum adjacent said first drum for receiving the diverted portion of mix from said first drum onto said second drum to bypass said application area.

14. A device according to claim 12 wherein said monitoring means comprises a window adjacent the flow of mix from said crossflow-mixing means and photoelectric sensor means for detecting varying optical qualities of said mix adjacent said window.